UNITED STATES PATENT OFFICE.

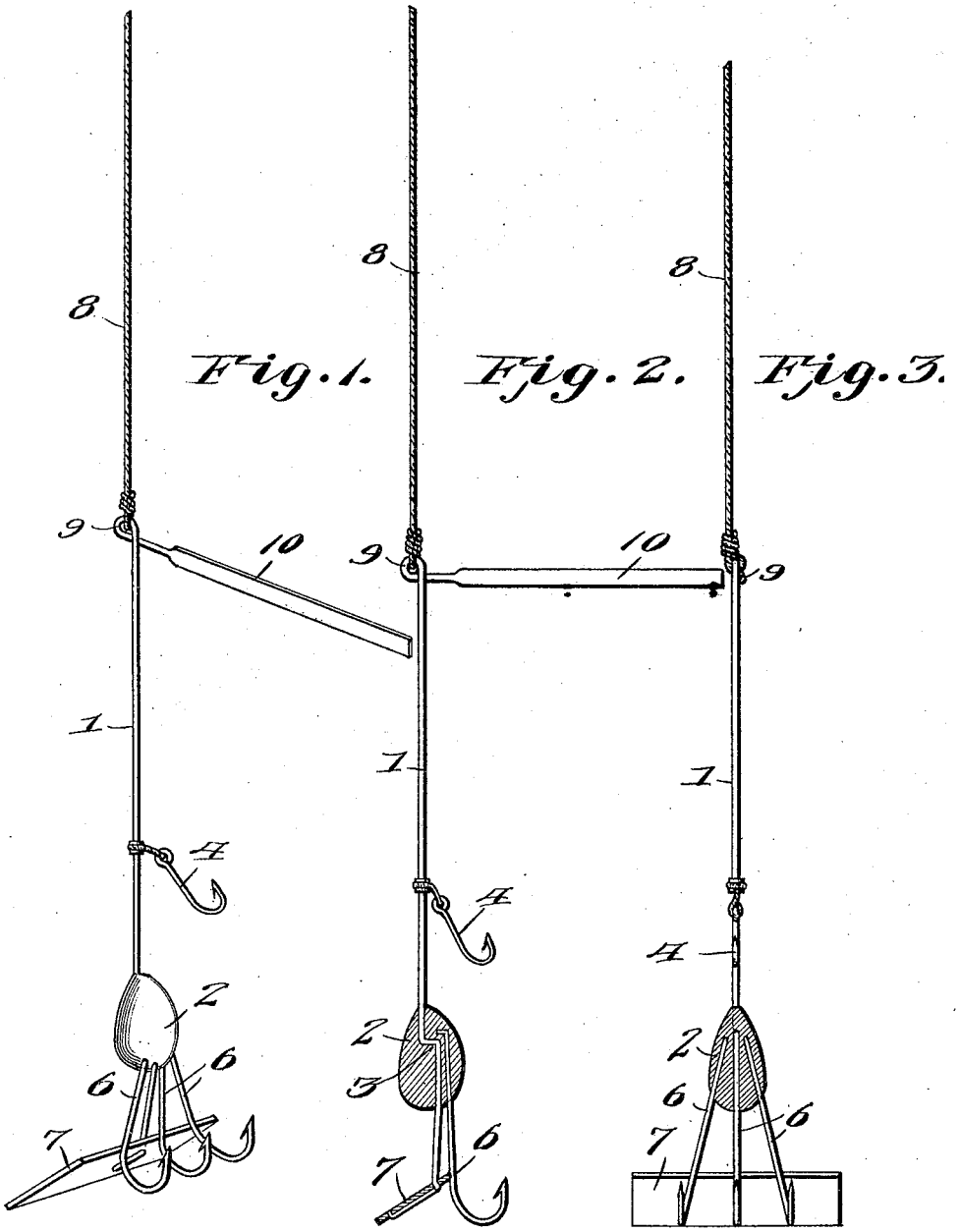

WALTER L. MOSS, OF BLAINE, GEORGIA.

FISHING DEVICE.

No. 810,789. Specification of Letters Patent. Patented Jan. 23, 1906.

Application filed August 19, 1905. Serial No. 274,855.

*To all whom it may concern:*

Be it known that I, WALTER L. MOSS, a citizen of the United States of America, residing at Blaine, in the county of Pickens and State of Georgia, have invented new and useful Improvements in Fishing Devices, of which the following is a specification.

This invention relates to a fishing device adapted especially for use in running water, although certain features thereof may be employed for fishing in still water.

The invention has for its object to provide a fishing device of that class employing a bait-hook in connection with one or more snag-hooks, wherein means are provided to maintain the hooks pointing down stream and to cause the snag-hooks to spring or to be projected forward and upward when the line is given a pull or jerk to snare or snag the attracted fish. By this means many fish will be snared which would otherwise escape.

The invention further has for its object to provide a construction which will obviate the necessity of mounting the element which causes the forward projection of the hook or hooks independent of the hook and which is so constructed and arranged as to secure a rapid and maximum degree of movement of the hook.

The invention in one of its forms of embodiment is illustrated in the accompanying drawings, in which—

Figure 1 is a perspective view of the fishing device. Fig. 2 is a side elevation thereof, showing the sinker and hook-impelling plate in vertical section; and Fig. 3 is a front elevation, also showing the sinker in section.

Referring now more particularly to the drawings, the numeral 1 designates a supporting member or shank preferably formed of wire and provided adjacent its lower end with a weighted enlargement 2, constituting a sinker to submerge the device to the required depth and add the desired amount of stability. This sinker is preferably formed by casting or molding lead about the shank, which latter is provided at the point of application of the sinker thereto with an offset portion 3, embedded in the sinker, and which holds the same from displacement on the shank. Above the sinker a bait-hook 4 is suitably supported from the shank, so as to extend at a downward and forward inclination therefrom. One or more snag or snare hooks 6 are fixedly mounted upon the shank, preferably by embedding the upper ends of the shanks thereof in the weight, said snag-hooks being arranged to project in the same direction as the bait-hook 4 and arranged a suitable distance below the same.

The shank 1 has its lower end projecting below the weight 2 and serving as a support for an impelling-plate 7. This plate may be of any desired form and dimensions, but is shown in the present instance as of oblong rectangular form and arranged in rear of and transversely with respect to the hooks 6. The purpose of this plate 7 is to impart a forward and upward projection to the hooks 6 when the line 8 is given a sharp tug or pull and to thereby cause the same to snare or snag the fish attracted by the hook 4 and nibbling at the bait thereon, this action being due to the resistance of the water to the upward movement of the plate 7, which latter is tilted downward to a substantially vertical position and at the same time projected forward or in the general direction of extension of the barbed bight portions of the hooks 6 from their shanks to forcibly impel said hooks. The plate is preferably arranged at an oblique angle in a forward and downward direction with respect to the vertical plane of the hooks 6, as it is found that this disposition causes the water, particularly where sharp currents are encountered, to act more efficiently upon the plate and to project the same to a greater extent than if the plate were horizontally disposed, the inclination of the plate permitting the force of the current to be exerted thereon to increase the projecting action.

The upper end of the shank 1 is bent to form an eye 9 for the reception and attachment of the line 8, and it is thence continued forwardly and flattened to form a vertically-disposed vane 10, which projects beyond the plane of the hooks and acts as rudder to prevent rotary movement or lateral deflection of the hooks 4 and 6 and to thereby hold the same constantly pointing down stream. It is well known that fish invariably in flowing waters swim up stream in search of food, and by the provision of the rudder-vane 10 the hooks will be maintained in the proper position to attract their attention.

The impelling-plate 7 and rudder-vane 10 may be nickel-plated, highly polished, or otherwise finished to render them attractive and to reflect or magnify the bait, thus adding to the luring qualities of the device, and it will be understood that a single snag-hook 6 or a gang of such hooks, as shown in the present instance, may be employed according to the caprice or fancy of the manufacturer or user and the nature or character of the fishing. In some instances the impelling-plate may be used as an adjunct in still-water fishing, but should be mounted and arranged in the manner shown in order to secure the best results.

Having thus described the invention, what is claimed as new is—

1. A fish-hook carrying a rudder-vane extending edgewise in the same general direction as the barbed bight portion of the hook to hold the same pointed in a desired direction in a stream.

2. A fishing device comprising a support carrying a hook and having a vane projecting therefrom in the same general direction as the barbed bight portion of the hook and forming a rudder.

3. A fishing device comprising a support having a weighted lower end, a snag-hook carried thereby, a bait-hook disposed above said snag-hook, and a vane disposed above the bait-hook and acting as a rudder.

4. A fishing device comprising a shank carrying a weight, a bait-hook above the weight, and a snag-hook projecting below the weight, and an impelling-plate supported by the shank in rear of said snag-hook.

5. A fishing device comprising a shank provided at its upper end with a rudder-vane, and carrying at its lower end a weight, a bait-hook upon the shank above the weight, a snag-hook projecting below the weight, and an impelling-plate supported below the weight and in rear of the snag-hook.

In testimony whereof I affix my signature in presence of two witnesses.

WALTER L. MOSS.

Witnesses:
AMANDA COCHRAN,
J. W. COCHRAN.